Figure 1:
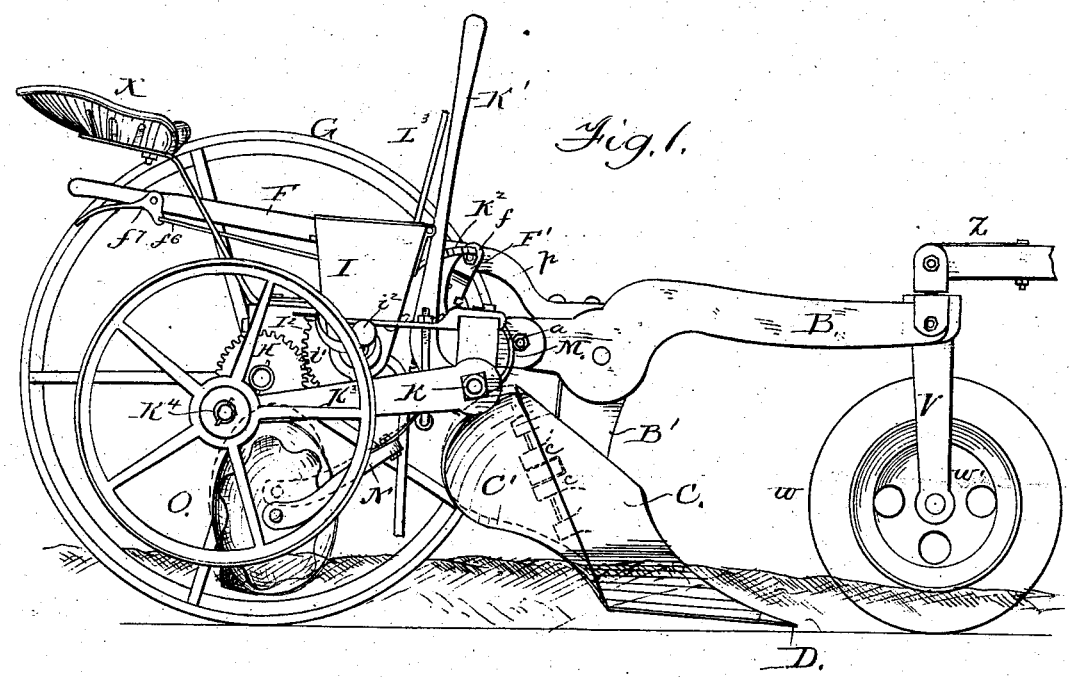

(No Model.) 9 Sheets—Sheet 1.

T. E. JEFFERSON.
COMBINED PLOW, HARROW, SEEDER, &c.

No. 260,482. Patented July 4, 1882.

WITNESSES
H. B. Applewhait,
H. Clay Smith

INVENTOR
Thos. E. Jefferson

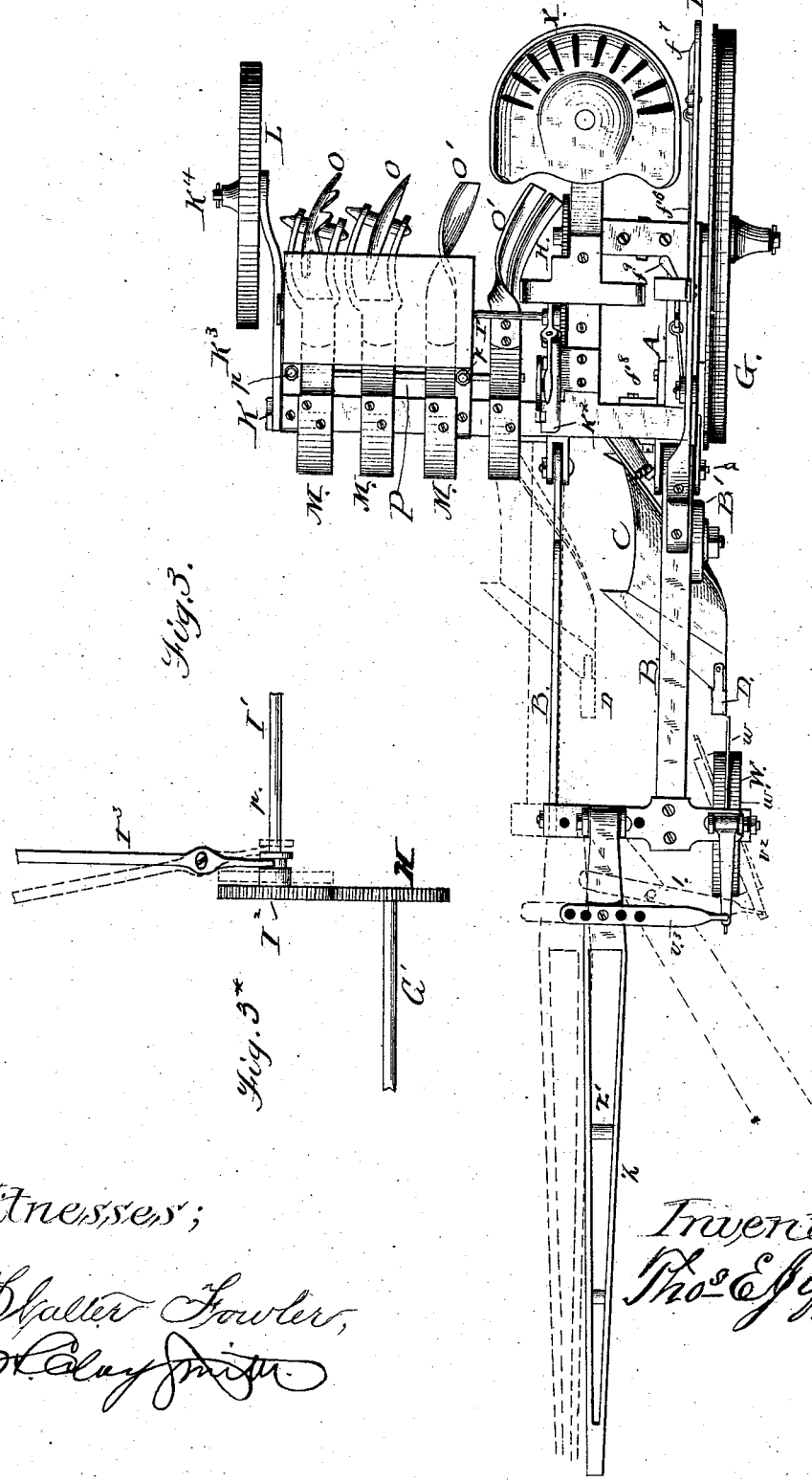

(No Model.) 9 Sheets—Sheet 3.
T. E. JEFFERSON.
COMBINED PLOW, HARROW, SEEDER, &c.
No. 260,482. Patented July 4, 1882.
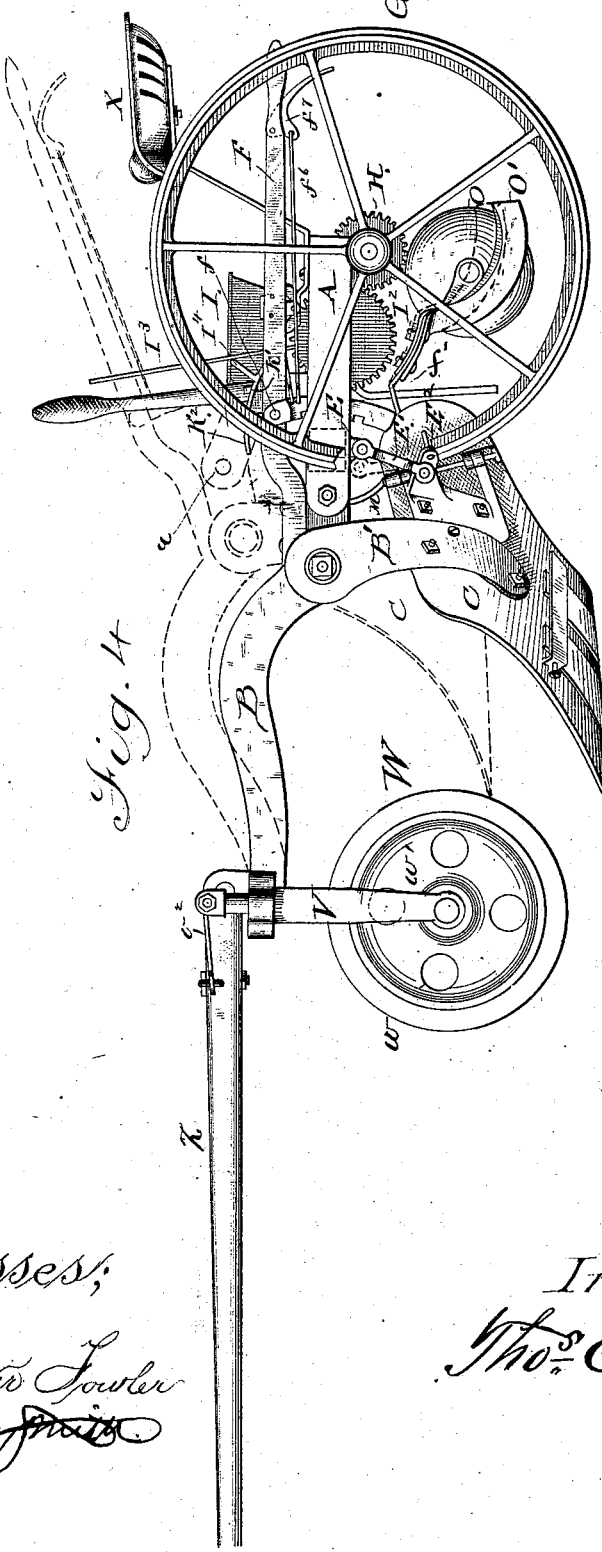
Witnesses:
J. Walter Fowler
Inventor:
Thos. E. Jefferson

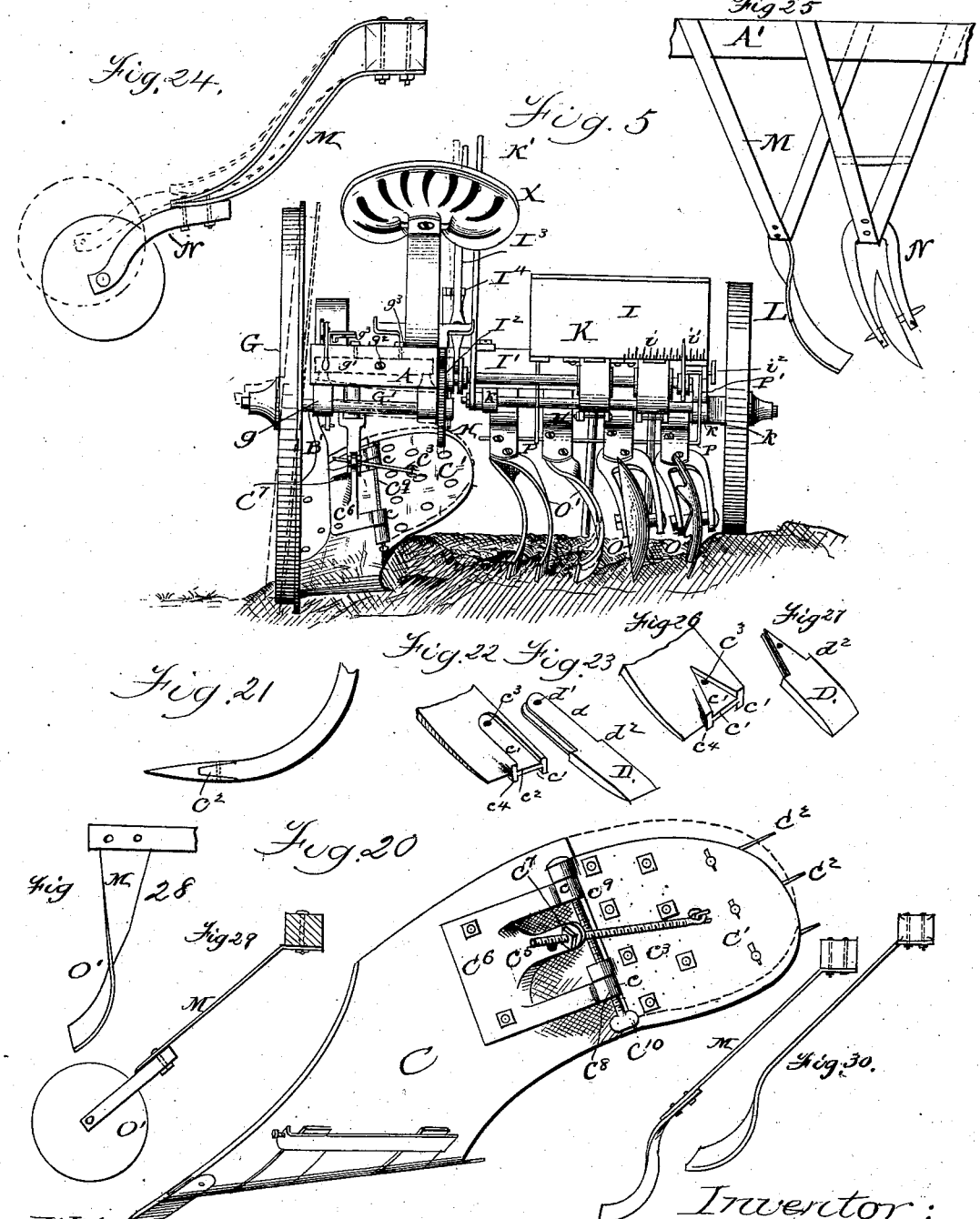
(No Model.) 9 Sheets—Sheet 4.
T. E. JEFFERSON.
COMBINED PLOW, HARROW, SEEDER, &c.
No. 260,482. Patented July 4, 1882.

(No Model.) 9 Sheets—Sheet 5.
T. E. JEFFERSON.
COMBINED PLOW, HARROW, SEEDER, &c.
No. 260,482. Patented July 4, 1882.
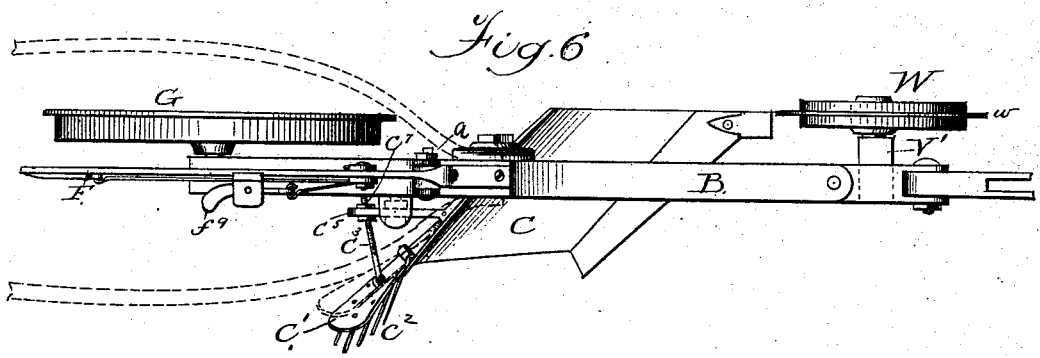
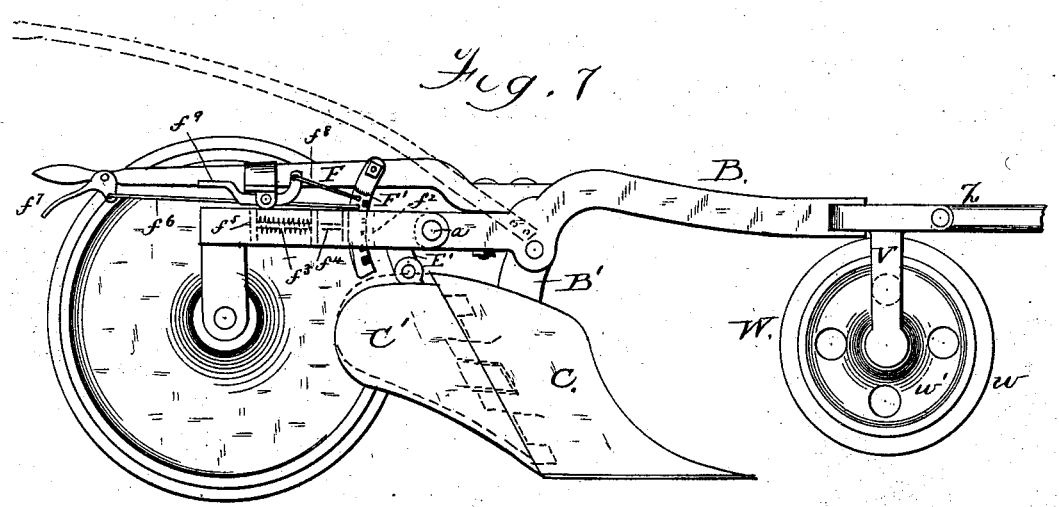
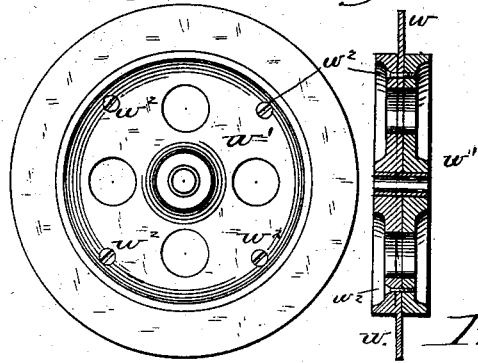

(No Model.)  9 Sheets—Sheet 6.
T. E. JEFFERSON.
COMBINED PLOW, HARROW, SEEDER, &c.
No. 260,482. Patented July 4, 1882.
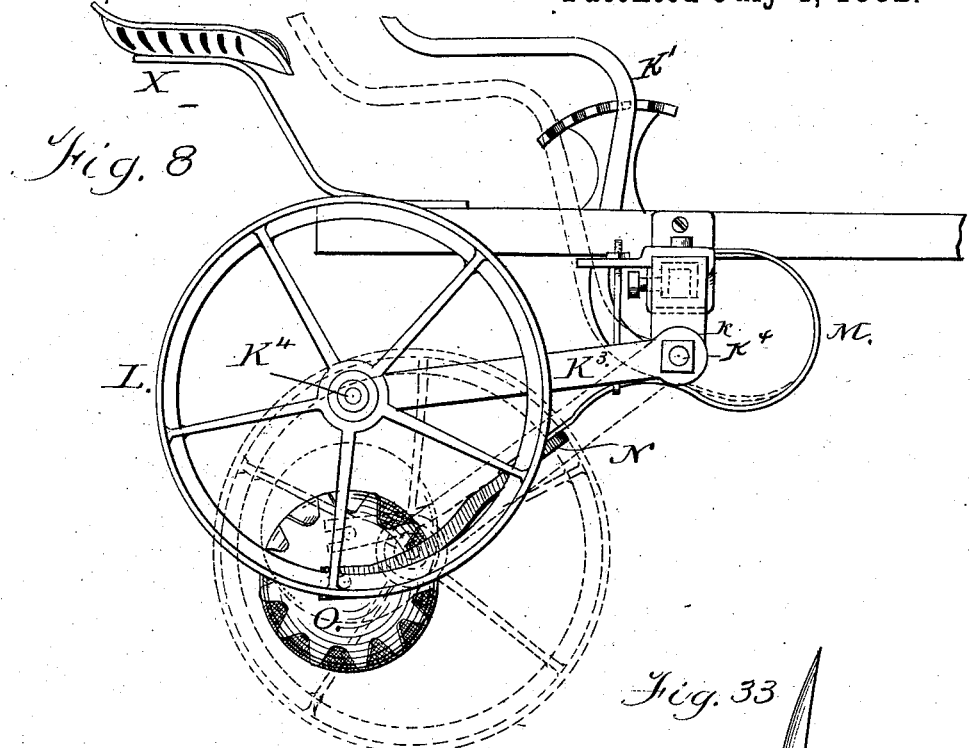
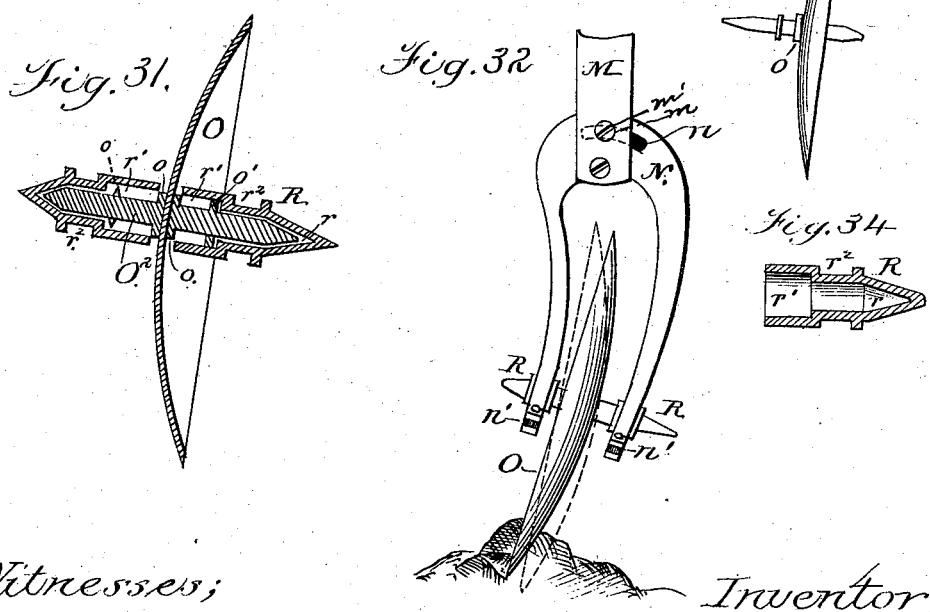
Witnesses:
F. Walter Fowler
H. Elmy Smith
Inventor:
Thos. E. Jefferson (No Model.)
T. E. JEFFERSON.
COMBINED PLOW, HARROW, SEEDER, &c.
No. 260,482. Patented July 4, 1882.
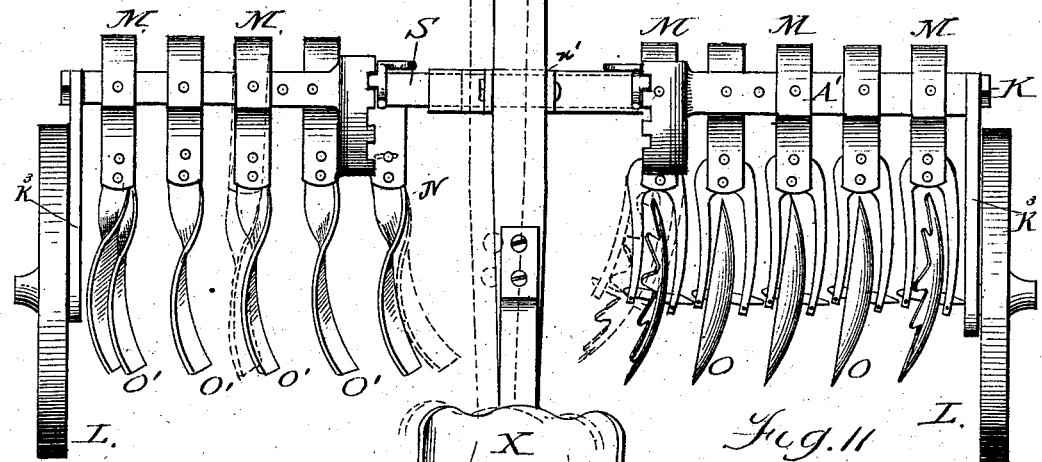
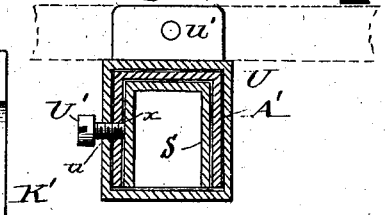
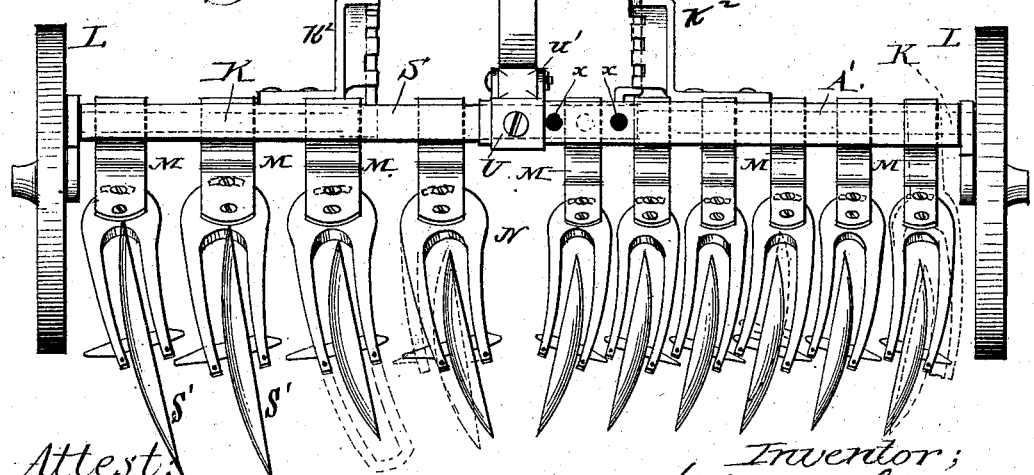
Attest:
Inventor;
Thos. E. Jefferson

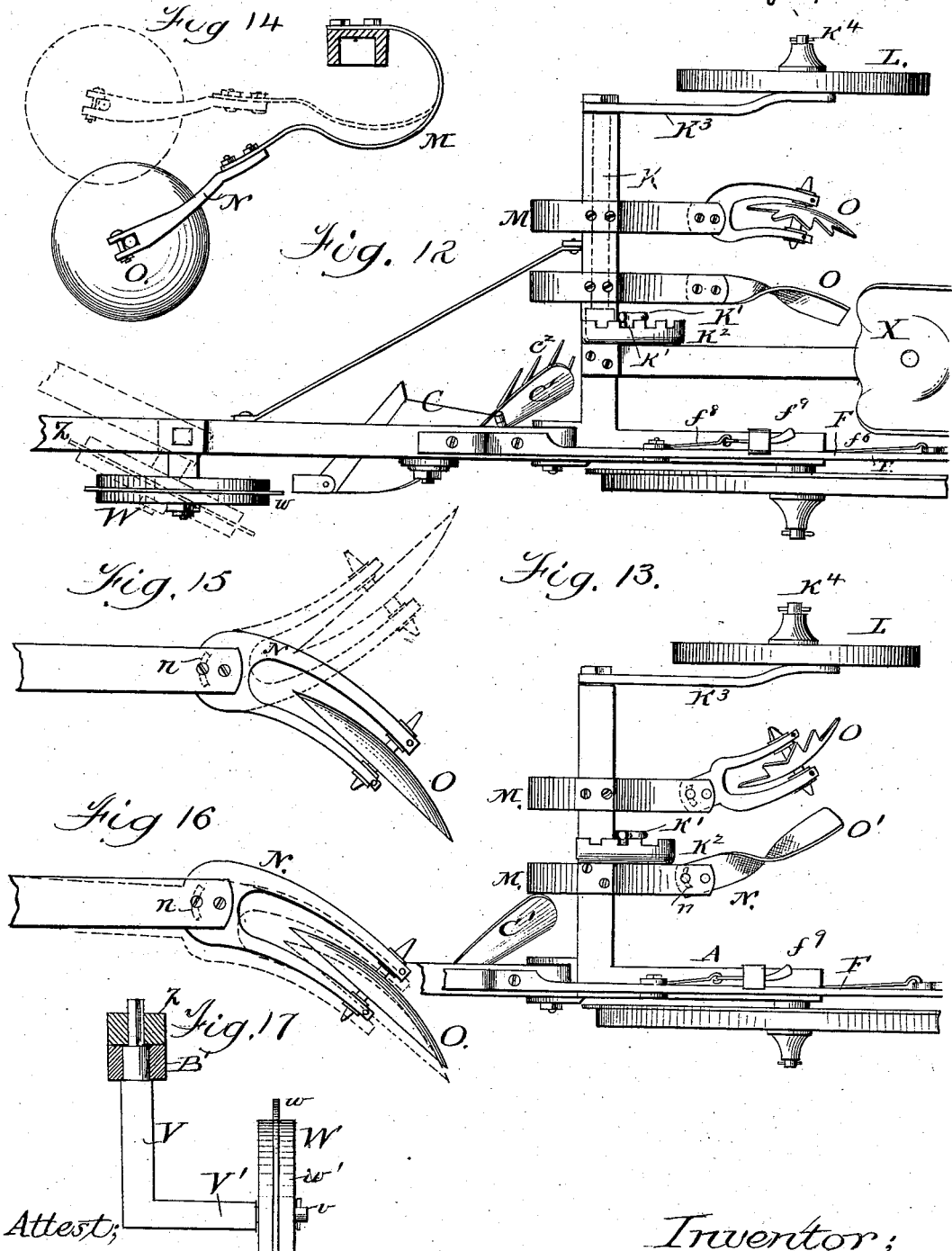

(No Model.) 9 Sheets—Sheet 9.
T. E. JEFFERSON.
COMBINED PLOW, HARROW, SEEDER, &c.
No. 260,482. Patented July 4, 1882.
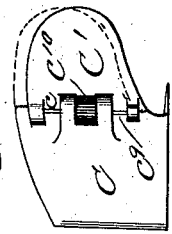
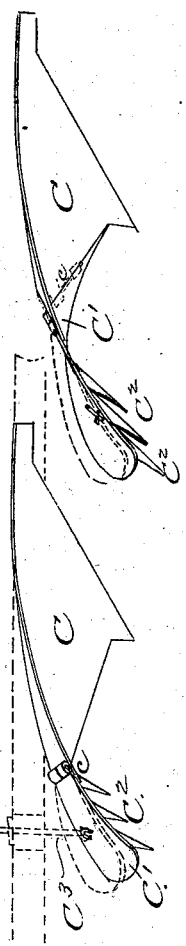
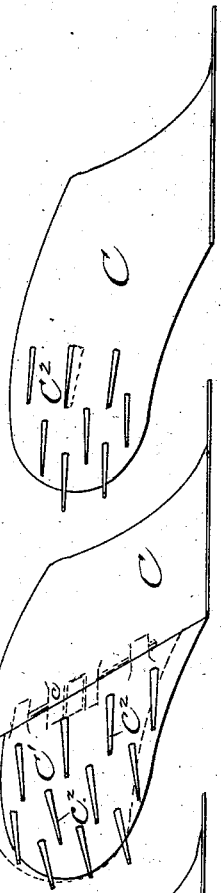
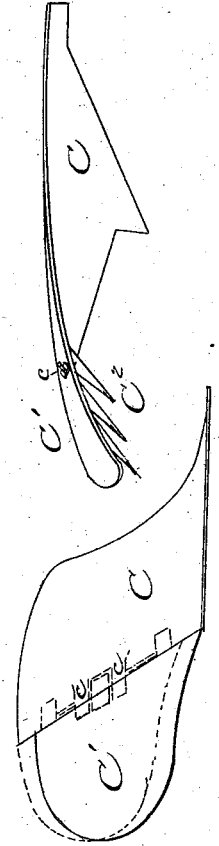
Witnesses;
Walter Fowler
H. Clay Smith
Inventor;
Thos. E. Jefferson

UNITED STATES PATENT OFFICE.

THOMAS E. JEFFERSON, OF BOSTON, MASSACHUSETTS.

COMBINED PLOW, HARROW, SEEDER, &c.

SPECIFICATION forming part of Letters Patent No. 260,482, dated July 4, 1882.

Application filed May 6, 1882. (No model.)

*To all whom it may concern:*

Be it known that I, THOMAS E. JEFFERSON, a citizen of the United States of America, residing at Boston, in the county of Suffolk and State of Massachusetts, have invented certain new and useful Improvements in Combined Plow, Harrow, Seeder, and Cultivator; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a plow, harrow, and seeder adapted to be used in combination or separately; and the novelty consists in the construction and arrangement of parts, as will be more fully hereinafter set forth, and specifically pointed out in the claims.

Among others, the object of the invention may be stated to be essentially, first, to provide a sulky-plow having a hinged or pivoted beam or beams, and having means for elevating the plow proper out of the soil without disturbing its horizontal position in relation to the other parts of the machine; second, to provide a hinged frame which will admit of the employment of more than one plow, each plow having preferably corresponding harrowing disks or teeth; third, to provide a pivoted colter or colters, according to the number of plows being employed, said colter or colters being manipulated automatically as the tongue is deflected to the right or left; fourth, to provide a peculiar arrangement of furrow-wheel, seeding device, means for adjusting and registering the amount of feed, and means for throwing the seeding mechanism in or out of operation from the driver's seat at will; fifth, to provide such a construction that the entire weight of the machine, and even the weight of the driver, will be utilized in promoting the efficiency of the parts; sixth, to provide a hinged mold-board adapted to plow various depths, and having rearwardly-inclined teeth or knives, adapted to be used on any plow, either sulky or hand; seventh, to provide a hollow cross-bar which forms a part of the main frame, which will allow the furrow-wheel, colter, and plow to be removed and a similar cross-bar of smaller dimensions to be adjustably received and secured therein for the purpose of converting the device into a harrow at will; eighth, to furnish a novel and useful means for securing the harrowing or plowing disks or teeth to a cross-bar, so as to allow universal play in case such disks or teeth meet obstructions or from any other cause; ninth, to furnish means for throwing either or both the plow and harrowing devices in or out of operation at will independently of each other; tenth, to provide a peculiar means for securing the plow-point in place; eleventh, to provide means for reversing the harrowing disks or teeth in relation to the spring-bearings, or for adjusting the pitch of the angle in relation to the line of travel; twelfth, to provide a compound adjustment of the device when employed as a sulky-harrow or cultivator, whereby the width of harrow or cultivator may be arranged at will, and the draft be adjusted so as to approximately locate said draft midway between said wheels, whatever their distance apart; thirteenth, to provide a furrow-wheel which may be adjusted upon either side of a vertical plane at will, so as to accommodate the side pressure of the plow; fourteenth, to provide journal-bearings for the harrowing-disks which will prevent the soil from entering the journal, and will afford a minimum of friction; fifteenth, to provide such a construction of the device when used as a harrow or cultivator that either or both of the riding-wheels may be thrown in or out of operation at will; sixteenth, to provide a device which may be employed interchangeably as a plow, or gang-plow, harrow, and seeder, as a plow and harrow by dispensing with the seeder, as a harrow, as a sulky-plow, as a cultivator, or as a hand-plow, at will; seventeenth, to provide a sulky-plow which may be turned toward the land side in plowing, or in the other direction, and describe the arc of a small circle without taking the plow out of the soil; eighteenth, to provide a tongue formed of metal cut diagonally lengthwise, one piece being reversed, and the parts held apart by pins, the ends being secured together and the surfaces rounded, the said pole being adjustable upon main frame and the colter-arm adjustable on the pole; nineteenth, to provide such a construction that the operator is enabled to plow, harrow, seed or plant, and fertilize and cover the seed all at one operation, or by once going over the field, thus leaving the soil thoroughly tilled and pulverized, with the crop in the ground and covered complete; twentieth, to provide a hinged mold-board having means for adjusting it up or down upon the plow-body, to allow the operator to plow a greater or less depth at will, and to accommodate the plow to various kinds of soil.

The invention is fully illustrated in the accompanying drawings, which form a part of this specification, and in which—

Figure 2:
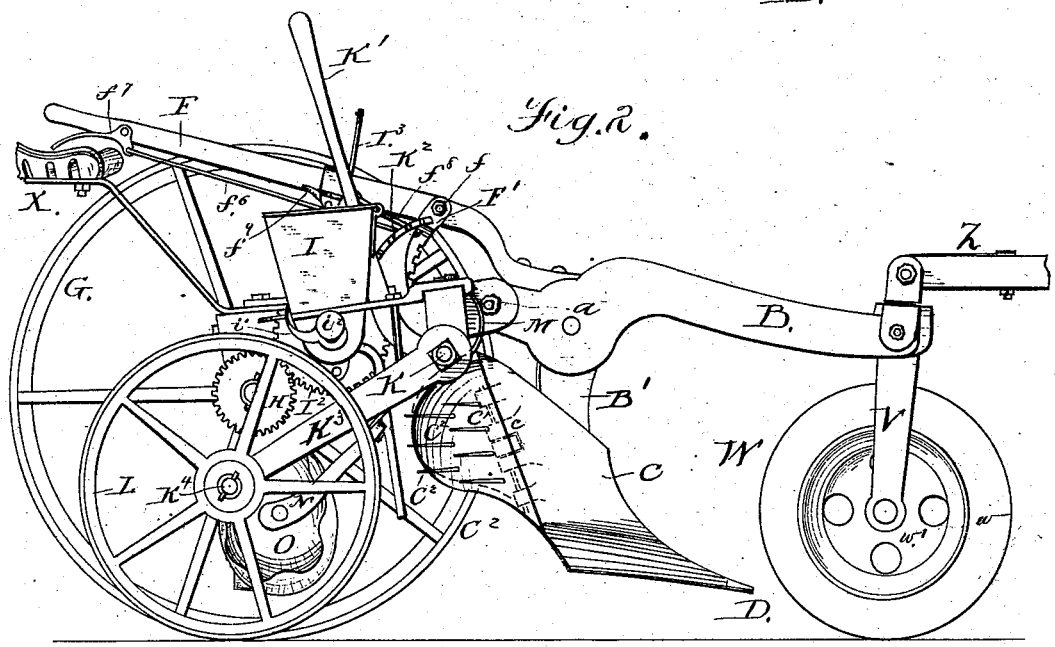

Figure 1 is a side elevation, showing the furrow-side wheel elevated, with the plow, colter, and harrowing devices in operation; Fig. 2, a similar view, showing the furrow-side wheel depressed as a riding-wheel and the plow elevated out of operation; Fig. 3, a top plan view, showing the operation of the tongue and colter in dotted lines, also a second plow. Fig. 3* represents a detail of the feed-shaft gear and the means for throwing it in or out of operation at will; Fig. 4, a side elevation looking from the land, showing the means for elevating the plow and the plow thus elevated in dotted lines. Fig. 5 is a rear view, showing the working devices in operation and the furrow-wheels deflected in dotted lines. Fig. 6 shows the device arranged for a hand-plow; Fig. 7, a side elevation as a hand-plow. Fig. 8 shows the device in side elevation as a sulky-harrow, the full lines showing the harrow in operation, and the dotted lines showing the harrow elevated and the riding-wheels in operation; Fig. 9, a top plan view, showing the hollow cross-bars, one operating within the other, the change of position in the tongue, and one of the disks adjusted to a more abrupt angle in dotted lines. Fig. 10 is a rear view, two of the disks serving as plows, and the harrowing-disks in operation. Fig. 11 is a detail view, showing the adjustable box and the means for locking it and the hollow cross-bars in any desired position. Fig. 12 is a top plan view, showing the fingered or toothed mold-board and the colter journaled on an arm pivoted to the frame, the dotted lines showing its location when the tongue is deflected. Fig. 13 is a similar view, showing the harrowing devices reversed and the means for adjusting their angle relatively to the line of travel. Fig. 14 is a detail view, showing the disk-spring and disk, the dotted lines indicating its position when riding over an obstruction. Fig. 15 is a detail view of one of the disks detached, the dotted lines showing it in a reversed position; Fig. 16, a similar view, showing the deflection of disk and spring; Fig. 17, a detailed view, showing the colter and its connections; Fig. 18, a side elevation of the colter, and Fig. 19 a central vertical section thereof. Fig. 20 is a detail view of the plow and mold-board, showing the adjustability of the mold-board in two directions.

Figs. 21, 22, 23, 26, and 27 are detail views, showing the method of securing the plow-points to the plow. Figs. 24 and 25 are detail views, showing the springs upon which the harrowing devices are adjustably secured and their manner of being secured to the cross-bar. Figs. 28, 29, and 30 are detail views of the harrowing devices. Fig. 31 is an enlarged sectional view, showing the manner of preventing soil from entering the journals of the disks. Fig. 32 is a detail view, showing the disk and its connections twisted, as it is allowed to do by the spring when forced out of its normal position by obstructions or other cause. Fig. 33 is a detail view of one of the disks and shaft or journal; Fig. 34, a detail view of a portion of its journal-bearings. Figs. 35, 36, and 37 are detail views of the hinged mold-board and its rearwardly-inclined fingers or teeth. Figs. 38 and 43 are detail views of a mold-board with the rearwardly-inclined fingers and means for securing them in place. Figs. 39 and 40 are similar views, showing the hinged mold-board with and without fingers. Fig. 41 shows the means for elevating or depressing the mold-board upon the plow-body; and Fig. 42 represents details representing different forms of teeth or knives.

This invention is designed to supply a great want in agricultural interests of the country, and many of its features are of great importance in both economy and usefulness. The machine is preferably made entirely of metal, and if properly painted and preserved, and occasionally replacing some of the wearing parts, will last for generations. The machine is interchangeable readily into the various devices hereinbefore mentioned, and several of its features will serve equally well in other machines and relations. I have aggregated these several novel features in a complete machine for a useful purpose, and will therefore describe the device as a whole.

To enable others to make and use the invention, I will describe the construction and operation of the same, referring for that purpose to the drawings. Thus:

A represents the main frame, pivoted to which at $a$ is the plow-beam B.

B' indicates the plow-standard, to which is rigidly secured the plow C, to which is hinged at $c$ the mold-board C'. The share of the plow-body C is provided upon opposite sides with recesses $c'$ cast in said body, divided by a plate, $c^2$, and through this plate is a hole, $c^3$. The reversible plow-point D is provided with jaws $d$, which embrace the plate $c^2$ and fit neatly in the recess $c'$ upon either side of the plow-body C, while a hole, $d'$, through both jaws $d$ coincides with the hole $c^3$ when the point is in place, and a pin, screw, or bolt allows the point to be securely fastened in proper position, but readily removable for repair, or to be replaced by another point or reversed. The shoulders $d^2$ upon the point D upon either side of the jaws $d$ abut against the portions $c^4$ of the body C. When desired the point may be readily reversed, as is obvious.

Secured upon or in or cast with the mold-board C' are rearwardly-inclined fingers or teeth $C^2$, which are located upon the face thereof, forward of the rear edge. As shown, their shanks are passed through holes in the mold-board and secured upon the landside thereof by pins or nuts. (See figures 20, 35, 40, 42 and 43.) These fingers $C^2$ not only hold the soil in a manner away from the mold-board and assist in turning the furrow, but they serve to pulverize the soil as the furrow is being turned, thereby utilizing the side pressure heretofore used in simply inverting the soil to pulverize or harrow the same while being inverted. The location and arrangement of these fingers are important—as, for instance, were they positioned upon the mold-board forward of the rear portion, they would act upon the soil to pulverize it before its elevation, leaving to the mold-board the work of inverting the furrow, the same as though they were not employed, would require much greater draft for the amount of service, and be very certain to clog and choke. If they were located upon the extreme rear end of the mold-board, the mold-board would also have the entire labor of inverting the furrow, the teeth not acting to pulverize until the mold-board, had completed the task of inversion. Therefore I find that their location as shown is the only practical arrangement whereby the said teeth operate in inverting the furrow which has been elevated by the mold-board, and by that action to pulverize the soil.

Loosely secured to the landside or back of the hinged mold-board C' is a threaded rod, $C^3$, which operates through a hole in an arm, $C^5$, of a bracket, $C^6$, secured upon the back of the plow-body C or to the plow-beam. By means of a nut, $C^7$, the position of the mold-board C' may be adjusted at will, or as indicated by the quality of soil being tilled.

Through perforated ears $C^8$ of the bracket $C^6$, and through similar ears upon the mold-board C', operates a threaded rod, $C^9$, and by means of a thumb screw or nut, $C^{10}$, the said mold-board may be adjusted upon the plow-body C to allow the operator to plow any desired depth within the capacity of the plow, and also to accommodate different qualities of soil. (See Figs. 20 and 41.)

The main body A, a portion of which comprises the front cross-bar, A', is formed of what is commonly known as "angle" or "channel" iron, the top and both sides of each bar or portion of said frame formed of one piece of metal, with the bottom open to protect the contained mechanism from falling rain or snow, or the like, and these portions of angle-iron are properly jointed and secured, as shown in Fig. 3. This form is durable, light, strong, and eminently adapted for this service. It affords efficient housing for some of the delicate mechanisms necessary to the proper working of the device, while other important parts of the machine are secured therein, out of sight, thus giving the machine a finished and sightly appearance.

Within the cross-bar A' is removably secured a perforated lug, E, in which is pivoted a link, E', the lower end of which is loosely secured to a perforated lug, $E^2$, upon the rear side of the plow. This link E' exercises an important function in preserving the position of the plow intact horizontally, whether the plow is in operation or elevated.

Rigidly secured to the plow-beam B is a hand-lever, F, to which is pivoted at $f$ a segmental rack-bar, F', which bar passes downward through a slot, $f'$, in the frame A and engages a stationary pawl, $f^2$, secured in said slot $f'$, with which it is held in contact by the constant force of a spiral spring, $f^3$, through which passes a headed rod, $f^4$, which operates in perforated partitions $f^5$ secured in the frame A. The rack-bar F' is disengaged from the pawl $f^2$ when the spring-pressure is overcome by means of a rod-connection, $f^6$, with a hand trip-lever, $f^7$, or by rod $f^8$ with a pedal-trip, $f^9$. Either or both of these trips may be used, as may be desired; but I prefer to employ both, and allow the driver to use either, as occasion may require.

It will be observed that the main frame pivots on the axes of the two riding-wheels, the plow-beam on the axis of the colter, and that the plow is secured to the beam between said colter and the furrow-wheel. The frame and beam being hinged or pivoted at $a$, when the hand-lever F is raised both the front of the frame and rear of the beam are elevated, and this action elevates the plow without changing its relative horizontal position, the standard B' acting from the beam B and the link E' from the frame A. It will also be observed that when the rack F' is held out of contact the entire weight near the pivot $a$, rests upon the plow and insures its immediate entrance into the soil.

G represents the furrow-wheel, which is flanged, as shown, and which is adapted to follow the plow in the newly-made furrow when said plow is in operation, the flange serving to resist the side pressure of the plow which is not taken up by the harrowing devices, which will be described. This furrow-wheel G is rigid with its shaft or axle G', and this shaft G' is journaled in perforated lugs $g$, the arms of which extend up into the frame A, and are loosely secured to a tilting bar, $g'$, pivoted at or near its center at $g^2$.

Operating in threaded apertures in the top of the main frame are two screws or threaded bolts, $g^3$, one of which bears upon the tilting bar $g'$ upon each side of the pivot $g^2$. By this construction the operator is enabled to elevate one of the bolts $g^3$ and depress the other, thus throwing the axle G' out of parallel with the plane of the frame, and this action deflects the furrow-wheel G to either side of a vertical plane, and as the side pressure and quality of the soil may suggest. (See Fig. 5.)

Upon the other end of the axle G is rigidly secured a pinion, H, which revolves with the furrow-wheel G, and its location is such that the deflection of the shaft G' will not affect its usefulness.

I represents a seed-hopper having feed-apertures, adjustable slides, &c., of any of the most approved constructions. The hopper has a scale, $i$, and an index, $i'$, indicates the amount of seed used per acre, this amount being adjusted by a thumb-screw, $i^2$, which governs the feed-slides. The feed-shaft I' has a toothed wheel, $I^2$, which is keyed to the shaft I', so as to have a longitudinal movement on said shaft, but which is forced to revolve therewith. A jawed hand-lever, $I^3$, pivoted to the toothed segment $K^2$, serves to throw the gear $I^2$ in or out of mesh with the pinion H at will, and this connection may be made whatever the deflection of the shaft or axle G'.

The hand-lever $I^3$ may be locked in either position by placing the same in the proper recess in the recessed arm $I^4$, secured upon the toothed segment $K^2$.

Upon the top of the hollow cross-bar A' is secured, by screws or otherwise, a series of flat steel springs, M, which extend forward, downward, and rearward in a proper curve, and then downward and rearward in an approximately straight line. Near the latter extremity they are provided with one or more threaded apertures, $m$, which receive set-screws $m'$, which operate in curved slots $n$ in the disk-frames or teeth-shanks N, and allow the adjustment of the teeth, knives, or disks at different angles at will or as occasion may require. If preferred, the curved slot may be in the springs M and the screw operate in the shank or frame. By either of these means the teeth or disks may be readily reversed, as seen in Fig. 15. When disks are employed the frame may be formed with simple jaws, as seen in Figs. 15, 16, &c., or may be whole, as seen in Fig. 10 in dotted lines, or any other form desired. The disks are lettered O on the drawings, and the teeth or knives O', and either or both may be employed, and different sizes of either may be used either to pulverize, partially invert, or wholly invert the soil. I have shown a toothed disk and a double tooth in Fig. 9. These forms prevent the soil being left in ridges, as is the case when the plain disk or single tooth is employed. A horizontal bar, P, supported by threaded arms P', secured to the main frame by a nut, $p$, not only serves to keep the harrowing devices in a line and support them in approximately the same plane, but the proper manipulation of the nut allows the operator to take up and compensate for lost power. I deem these flat springs important in the arrangement, adaptation, and relation shown. The spring action is very effective for this purpose, and the capacity to accommodate themselves to any position of the harrowing devices renders their services valuable. For instance, in Figs. 5, 10, and 14, 24, 25, &c., the disk or tooth rides independently vertically over an obstruction. In Fig. 16 a lateral play is given, as also in Figs. 9 and 10. In Fig. 32 the disk is not only deflected from a vertical plane, but is twisted in any direction, and these and all other movements are allowed by the flexibility of the flat springs M, arranged as herein shown. By the use of this independent arrangement of spring-arms, I am enabled to employ disks or teeth of much less weight, and not only does this construction materially economize the draft, but the disks are enabled to traverse and till or pulverize the entire surface of the soil.

In devices of this character much inconvenience arises from sand, grit, or soil which finds its way into the disk-journals, owing to their close proximity to the soil-surface while in operation and the nature of the work they perform. My invention is designed to obviate this. Hence I employ journal-boxes R, having conical or rounded bearings $r$ and annular spaces $r'$ within. A recess, $r^2$, upon each box R is adapted to be embraced and secured in the jaws $n'$ of the frame N, as seen in Fig. 32. The disk is rigid between two collars, $o$, and the disk-spindle $O^2$ is provided upon each side with an annular collar, $o'$, which very nearly fills the space $r'$, and the dirt is entirely excluded from the bearings.

Properly journaled in perforated lugs $k$, formed in one with and secured to the cross-bar A', is a rock-shaft, K, carrying a rigid hand-lever upon one end and a crank-lever upon the other. These parts are rigid with each other, and the hand-lever and crank-lever stand at nearly right angles to each other. The hand-lever K' has a lug, $k'$, which springs into the recesses of the toothed segment $K^2$, as it is directed, and it is the means for operating the crank-lever $K^3$ upon an arm, $K^4$, of which is journaled the furrow-side wheel L. As the driver forces the hand-lever K' toward him he depresses the crank-lever $K^3$, which elevates the harrowing devices and brings the furrow-side wheel L into operation. Thus it will be observed that the plow and harrowing devices may be thrown in or out of operation independent of each other, and that either device may be employed without the other at will.

The cross-bar A', of channel-iron, is adapted to receive a similar cross-bar, S, of smaller dimensions, when the plow, colter, and furrow-wheel are removed to convert the device into a harrow or sulky-harrow or cultivator, the said bar S being otherwise provided with devices similar to those upon A'.

S represents a cross-bar of angle or channel iron, of such smaller dimensions than the similar bar A' that it will slide easily therein. It is provided with curved flat springs M and with similar harrowing devices O', with a toothed segment, $K^2$, placed in reverse position, and operating hand-lever K' and crank-lever K³.

The cross-bar A' is provided with several holes, $x\ x$, so as to adjust the draft and seat X to the center of the device, and a rectangular band or box, U, corresponding in form and size to the bar A', is placed over said bar, with the hole $u$ coincident with one of the holes $x$ in the bar A'. A set-screw, U', passes through the holes $u\ x$ and binds upon the bar S, which has been forced within the bar A', and locks it firmly in place.

The seat-standard is secured to the pole by proper ears $u'$ and securing means, and is held rigidly to the box U. By means of the two levers K' either or both sides of this harrow may be thrown in or out of operation at will, while the cross-bars S A', of angle-iron, as shown, the securing means therefor, and the peculiar flat spring M, as described, render the construction novel, useful, and important. (See Figs. 9 and 10.)

In Fig. 10 I show two plowing-disks, S', which serve to partially invert the soil, while the following harrowing-disks may complete the inversion. This construction of disk-plows, with or without the harrowing devices, is valuable in light soil where there is no sod; but they will serve efficiently either singly or in gangs in other conditions.

An important feature in this invention consists in the peculiar colter shown and its relation to the other parts. It is a great desideratum in colters to have as thin a blade as possible, in order that a minimum of weight will do the required service of penetrating the sod with light draft, and in such cases the colter must be either lifted out of contact with the soil or great danger of breaking the blade in turning exists. I seek to obviate this, and not only to provide for an exceedingly thin blade, and have that blade and its binding-disks serve as a bearing-wheel for the machine, but also to provide for turning in either direction without either taking the colter out of contact with the soil or incurring the risk of its destruction.

In Fig. 17 I show a standard, V, rigid with a horizontal arm, V', upon the free end of which, at $v$, is journaled the colter W. The standard V passes loosely through the beam B' or cross-bar, and is rigid with the pole Z. It will readily be seen, therefore, that as the pole is deflected from the line of travel the colter immediately accommodates itself to the new direction, and whatever that direction may be the colter serves as a bearing or riding wheel.

In Fig. 3 a hinged arm, $v^2$, connects loosely with an arm, $v^3$, adjustable upon the pole Z, which is adjustable upon the beam-head. This construction serves all necessary purposes so long as the machine has headway; but a direct turn, with the machine at rest, is liable to wrench and break the thin blade, as that forms the pivot in turning. In the former construction, however, the turn may be made from a rest, and the slightest deflection of the pole Z gives motion, forward or back, to the colter, and prevents the destructive wrenching of the knife or colter blade.

In Figs. 18 and 19 I illustrate the colter proper. The thin disk-knife $w$ is clamped between two open disks, $w'$, and secured firmly in place by screws $w^2$. The outer edge of the knife-disk is beveled or sharpened, and the shoulders of the disks $w'$ serve as bearings upon the soil should the cutting-colter go deep enough.

The tongue Z is of peculiar construction, and seems especially adapted for this kind of machine. It is hinged to the beam-heads or cross-bar, and as the colter receives the weight from the beams it relieves the necks of the horses from any weight from the machine. It is light, strong, and durable, and may be made of ordinary band or other iron cut and severed diagonally, one piece being reversed to bring the small ends in juxtaposition. These pieces are rounded and secured at such proper distance apart as to form a proper incline for the purpose, pins or lugs separating the pieces sufficiently. The sides are lettered Z and the pins Z'.

In case the flat springs prove too flexible and give to the harrowing devices too easy a lateral play, I prefer to arrange the springs as shown in Figs. 24 and 25. In that construction they will have sufficient sidewise and twisting play for the desired purpose, while the curvature and other distinguishing features are or may be the same.

As illustrated in Figs. 29 and 30, the spring M is shown straight; but the adjustable, removable, reversible connections with the disks are the same, while in Fig. 28 the curved spring and harrowing-tooth is made of a single piece, twisted to give the tooth portion the proper form. By the employment of this spring I obviate the necessity of using separate arms and springs, as the spring forms the arm, or, in other words, acts as a spring-arm, and the form of the spring is not material to the result, the gist of this part of the invention being the employment of a disk or tooth supporting arm, which of itself is a spring.

In Figs. 6 and 7 I show the plow with the hinged adjustable mold-board and inclined fingers and the thin colter-knife obtaining its motion and direction from the tongue, said colter acting as a bearing-wheel for the forward end of the plow-beam, and also the flanged furrow-wheel arranged in relation to a hinged frame and beam, so as to serve as a hand-plow. The plow is elevated by similar means, and similarly adapted to enter the soil as soon as depressed. In this construction the plow-handles are shown in dotted lines, and it will be understood that this is one of the uses to which the interchangeable machine is adapted.

The plow-beam is made of angle or other iron, the part forward of the hinge being supported by the colter-wheel, and the tongue being pivoted, there are two joints with only the weight of the tongue upon the necks of the draft-animals. The main frame is so formed that the weight of the driver will approximately compensate for the weight of said frame forward of the axes of the wheels.

The driver may materially assist the working of the plow by throwing his weight forward or back, as occasion may suggest, and this can be accomplished with little inconvenience. The weight upon the furrow-wheel side gives the harrowing devices a proper gravity, while the driver's weight, as aforesaid, assists materially in bringing the wheel L into operation and in elevating said harrowing devices. The draft attachment being slightly above the point of resistance, the employment of said draft insures that both plow and cutter-colter shall be forced into immediate use.

As shown in Fig. 5, the flanged wheel G is deflected so as to bring the bearing portion thereof in the inner corner of the newly-made furrow, in which case the landside holds the plow in one direction and the flange in the other against lateral pressure, from whatever source it may arise.

Among others, one of the objects of the inclined teeth upon the face of the mold-board is to allow the roots and the débris to pass without catching upon the teeth.

I do not confine myself to the perforated ears $C^8$, the bracket $C^6$, the threaded rod $C^9$, or nut $C^{10}$, as any other means may be employed without departing from the principle of my invention, one essential feature of which is a mold-board susceptible of vertical adjustment upon the plow-body C for the purpose of multiplying the capacity and usefulness of the plow by allowing the depth of furrow to be adjusted at will.

I deem the link E' important, serving, as it does, to retain the relative horizontal position of the plow whether in or out of operation. I have shown a link with specific connections to the frame; but it is obvious that any other means which will act with the plow-standard to preserve the position of the plow intact will be equivalent devices.

It will then be observed that this machine, being interchangeable into the several devices mentioned and shown, is eminently useful, economical, and important. It may be employed as a sulky-plow and harrow, as a sulky-plow either with a single plow or a gang without harrowing devices, as a sulky-harrow, as a hand-plow, as a cultivator, or as a simple harrow, a seeder, and fertilizer, and a coverer, by simple changes in the parts. In agricultural pursuits the farmer will readily appreciate the value of this interchangeable combination, both in actual expense and labor; but the material and construction employed being of the most approved kind that experiment and experience could suggest, the value is thereby greatly enhanced. The fact that the soil may be plowed, inverted, harrowed, pulverized, planted, and covered by going over the surface but once also adds greatly to the value of the device as an entirety, as no subsequent treatment for these steps are necessary.

What I claim is—

1. In a sulky-plow having a furrow-wheel, a furrow side wheel, and a colter serving as a bearing-wheel at the front, the hinged frame and plow beam or beams, combined with the plow situated between the furrow-wheel and colter-wheel, and bearing upon said wheels whether said plow is in or out of operation, as and for the purposes herein set forth.

2. In a sulky-plow, the combination of a wheel-frame hinged or pivoted to the rear end of plow-beam, the latter supported on a swiveled colter at its front end, and having means for elevating the frame and beam at the point of their hinged connection, and a balancing driver's seat, arranged in the rear of the axis of the rear bearing-wheels to aid the lever in lifting the plow, substantially as set forth.

3. In a sulky-plow, the plow proper and means for elevating the same in a horizontal plane, combined with the furrow-wheel, whereby the said wheel, riding up the incline formed by the partially-elevated plow, serves to further force the plow out of the ground, as specified.

4. In a sulky-plow, the main frame pivoted on the axes of the riding-wheels, the plow beam or beams hinged thereto and supported by the colter and the hinged pole, all constructed, arranged, and combined as and for the purposes set forth.

5. The plowshare C, having V-shaped recesses cast vertically parallel with each other upon either side thereof, combined with a reversible point, D, having V-shaped parallel jaws d, and securing means, substantially as shown and set forth.

6. The combination, with a sulky-plow or harrow, of a harrowing device consisting of the spring-arms M and the double teeth O', adapted to be used in connection with single teeth or disks to pulverize and level the soil, as shown and described.

7. In a plow, a mold-board the rear portion of which is separate or hinged and adapted to be adjusted vertically upon the fixed portion, as and for the purposes set forth.

8. In a plow, a hinged portion of the mold-board, adapted to be adjusted vertically upon the fixed mold-board, whereby the operator may plow at any desired depth within the capacity of the device, as set forth.

9. In a plow, a hinged mold-board susceptible of vertical adjustment upon the plow-body for the purpose described, combined with means, substantially as specified, for imparting to said mold-board any desired angle with relation to the line of travel, as set forth.

10. In a plow, a mold-board having teeth or fingers secured or cast upon the rear portion of its face immediately forward of the rear edge thereof, said teeth being inclined rearwardly approximately in a line traveled by the furrow-slice, as shown, and serving not only to relieve the rear end of the mold-board of friction and assisting to turn the furrow, but also serving to pulverize the soil as the furrow is being inverted, and utilizing the side pressure arising from plowing for that purpose, substantially as set forth.

11. A hinged mold-board, C', having fingers C² cast or secured upon its face forward of the rear edge thereof, said fingers being inclined rearwardly more or less as the hinged section may be adjusted to pulverize the soil as the furrow is being turned, as and for the purposes herein specified.

12. A hinged mold-board, C', having rearwardly-inclined teeth or knives C², combined with means, substantially as described, for imparting oscillatory adjustment to said mold-board C' in relation to the hinge c, as set forth.

13. The hinged mold-board C', having rearwardly-inclined teeth or knives C², combined with the threaded rod C³, perforated arm C⁵ upon the bracket C⁶, and with the adjusting-nut C⁷, as set forth and herein described.

14. The hinged mold-board C' and bracket C⁶ upon the plow-body C, combined with the threaded rod C⁹ and nut C¹⁰, whereby the said mold-board may be raised or lowered at will to accommodate the depth of furrow, as and for the purposes specified.

15. The frame A', made of channel-iron, with open bottom, and adapted to receive and house working parts of the machine, in combination with rock-shaft K, arm K³, and wheel L, substantially as shown and described.

16. The hand-lever F, rigid with the plow-beam, and the frame A', hinged to said beam, combined with means, substantially as described, for adjusting the pitch of the frame and beam and the consequent elevation of the plow by hand or foot lever at will, as specified.

17. The hand-lever F, rigid with the plow-beam, the segmental rack-bar F', pawl f², rod f⁴, and spring f³, combined with frame A and the hand and pedal trips f⁷ f⁹, as and for the purposes herein set forth.

18. In a plow, and in combination with a jointed frame or beam, a loose link connecting the rear of the plow proper to the portion of the support in rear of the hinge or joint, and adapted to serve, with the plow-standard secured to the support forward of the said hinge or joint, to preserve the horizontal position of the plow whatever its vertical elevation, as set forth.

19. The combination of the hinged support, the standard B', hung from said support forward of the hinge, and the plow C with the link E', connecting the rear of said plow to the support in rear of the hinge, as and for the purposes specified.

20. The link E' and standard B', combined with the plow, the main frame, the plow-beam, the hand-lever F, the segmental rack F', the spring f³, and the double trips, as and for the purposes hereinbefore set forth.

21. The flanged furrow-wheel G and axle G', combined with the lugs g, pivoted tilting bar g', and adjusting-bolts G³, as and for the purposes set forth.

22. The feed mechanism and adjusting and registering devices, combined with the feed-shaft, the gear I², lever I³, and the pinion H upon the tilting furrow-wheel shaft G', and the furrow-wheel G, the gear I², and pinion H being adapted to be thrown into mesh whatever the deflection of the wheel G and shaft G', as and for the purposes specified.

23. The perforated partitions f⁵, the headed rod f⁴, and spiral spring f³, all housed in the frame A, combined with said frame A, formed of angle-iron, as shown, and with the segmental rack-bar F', hand-lever F, and trip-connections, as and for the purposes set forth.

24. In a disk plow or harrow, independent springs or spring-arms secured to the cross bar or bars, combined with independent removable concavo-convex disks, substantially as described and set forth.

25. The springs M, supporting the harrowing devices, secured to the cross-bar A', and describing approximately a portion of an ogee curve, each independently combined with adjustable, removable, and reversible harrowing devices, and adapted to allow a universal play thereto, in a manner as and for the purposes set forth.

26. The flat springs M, as shown, having threaded apertures m, combined with the harrowing-teeth or disk-frames having curved slots n, and with set-screw m', allowing such teeth or frames to be adjusted at any desired angle in relation to the line of travel, or to be reversed at will, as and for the purposes set forth.

27. The combination of the independent flat springs M and adjustable removable reversible teeth or disks with the holding-bar P, threaded arms P', nut p, and frame A, as and for the purposes described and set forth.

28. The disk journal-boxes R, having conical or rounded bearings r and spaces r', combined with the disk-spindle O², having annular flange o', substantially as set forth.

29. The combination of the journal-boxes R, having annular recesses r², internal chamber, r', and bearings r, and the disk-spindle O², having collars o, which rigidly embrace the disk, and having annular flanges o', combined with the disk-frame N, having jaws n', the whole being adapted to serve as and for the purposes set forth.

30. An interchangeable sulky plow and harrow having a cross-bar, A', of angle-iron, with harrowing devices, as shown, adapted to receive a similar cross-bar having similar harrowing devices, combined with means substantially as described, for throwing either or both sides in or out of operation at will, as set forth.

31. In a sulky-harrow, the combination of cross-bar A', adapted to slide upon and be secured to a duplicate cross-bar or section, S, with the box U, having ears w', the seat X, and pole Z, as set forth.

32. In a sulky-harrow, a side section composed of the cross-bar A', of channel-iron, the springs carrying independent disks or teeth, the rock-shaft K, with lever K', and provided with crank-arm $K^2$ and wheel L, and adapted to receive a cross-bar provided with duplicate devices, arranged to slide into and be secured to the bar A', as set forth.

33. The combination of a revolving colter, a right-angled standard, or the equivalent thereof, swiveled in the plow beam or frame, and a tongue properly secured to said standard, whereby the plow is enabled to turn in either direction, and describe the arc of a small circle without taking the plow out of the soil or injuring the colter-blade, as specified.

34. In a sulky-plow, a revolving colter combined with and adapted to receive motion and direction from the draft-tongue, as and for the purposes hereinbefore set forth and described.

35. In a sulky-plow, a revolving colter which serves at all times as a bearing or riding wheel for the forward end of the plow-beam, combined with a pivoted pole, to which it is connected and from which it receives motion and direction, as and for the purposes set forth.

36. The colter W and standard V, combined with the arm V', the adjustable pole Z, and the plow-beams B', substantially as set forth.

37. In combination with a sulky plow or harrow, the tongue Z, hinged to the frame thereof, and formed of band-iron cut diagonal, one piece being reversed to bring the narrow ends together, and both parts bent to form an approximate arc of a circle in transverse section and secured together, substantially as set forth.

In testimony whereof I affix my signature in presence of two witnesses.

THOMAS E. JEFFERSON.

Witnesses:
H. CLAY SMITH,
M. P. CALLAN.